(No Model.)
N. F. BENSON.
LOCK FOR BICYCLES.
No. 596,974. Patented Jan. 11, 1898.
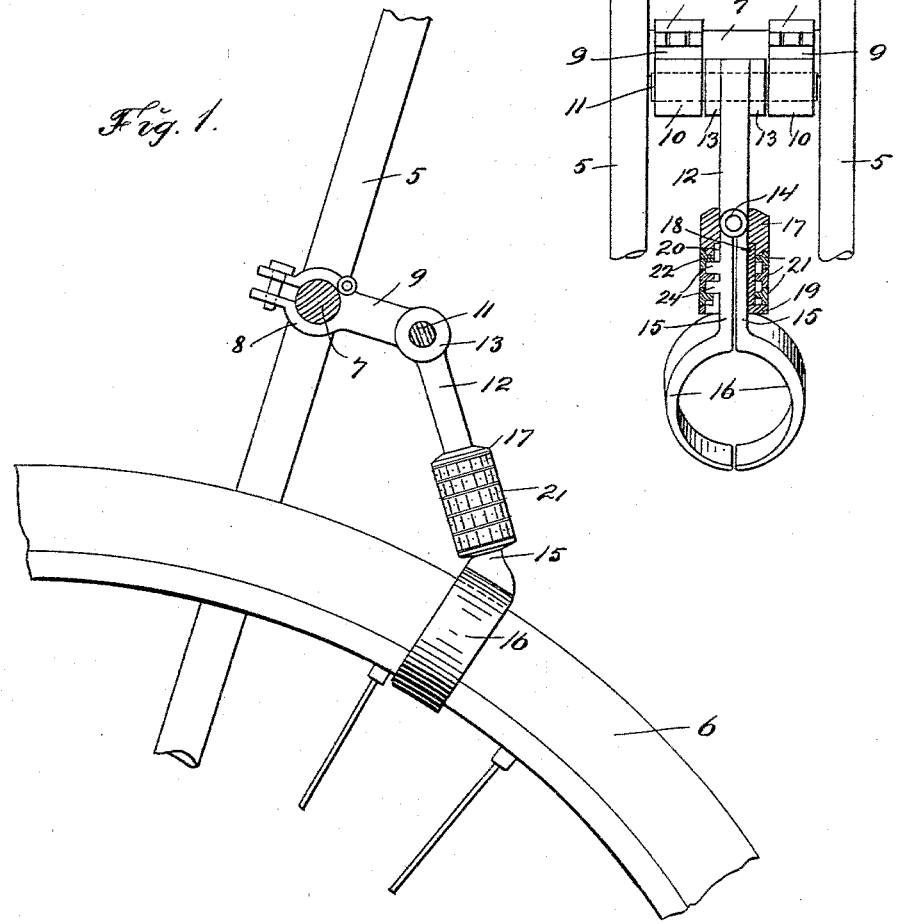
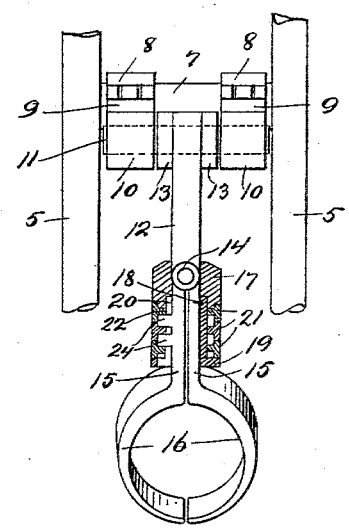
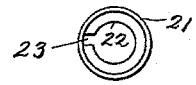
WITNESSES:
INVENTOR
Nels F. Benson
BY
Edgar Tate & Co
ATTORNEYS.

United States Patent Office.

NELS F. BENSON, OF NEW YORK, N. Y.

LOCK FOR BICYCLES.

SPECIFICATION forming part of Letters Patent No. 596,974, dated January 11, 1898.

Application filed May 12, 1897. Serial No. 636,146. (No model.)

*To all whom it may concern:*

Be it known that I, NELS F. BENSON, a subject of the King of Sweden and Norway, residing at New York, in the county of New York and State of New York, have invented certain new and useful Improvements in Locks for Bicycles and Similar Vehicles, of which the following is a full and complete specification, such as will enable those skilled in the art to which it appertains to make and use the same.

This invention relates to locks for bicycles and similar vehicles; and the object thereof is to provide an improved combination-lock of this class which may be connected with the frame of the vehicle and operates in connection with one of the movable parts thereof.

The invention is fully disclosed in the following specification, of which the accompanying drawings form a part, in which—

Figure 1 is a side view of a part of one of the wheels of a bicycle or similar vehicle and a part of the frame of the vehicle, showing my improved lock connected therewith and the method of its operation; Fig. 2, a rear view of that part of the frame with which the lock is connected and showing the lock connected therewith, a part of said lock being in section; and Fig. 3, a plan view of a ring which forms a part of the lock.

In the drawings forming part of this specification the separate parts of my improvement are designated by the same numerals of reference in each of the views, and in said drawings I have shown at 5 the sides of the rear fork of a bicycle, and at 6 a part of the wheel mounted therein, and the sides 5 of the rear fork of the bicycle are connected by a cross-rod 7, with which are connected two clamps 8, each of which is provided with a backwardly-directed arm 9, each of which is provided with a circular head 10, in which is mounted a shaft 11, and pivotally connected with the shaft 11 and adapted to swing thereon is a rod 12, which is provided with a hub 13, through which the shaft 11 passes.

Hinged to the outer end of the rod 12, at 14, are two similar rods 15, each of which is semicircular in cross-section, and the rods 15 when folded together are of the same size as the rod 12, and said rods 15 are provided with semicircular jaws 16. I also provide a sleeve 17, which is mounted on the rod 12 and adapted to slide thereon and also to slide over the hinge 14 when said rods 15 are folded as shown in Fig. 2, and secured in the sleeve 17 is a tube 18, which is provided at its outer end with an annular flange or rim 19, and said tube 18 is provided at one side with a longitudinal slot 20, and mounted on said tube are a plurality of rings 21, which are preferably three in number, and these rings are each provided centrally with an inwardly-directed flange 22, in one side of which is formed a notch or recess 23, this construction being best shown in Fig. 3.

One of the rods 15 is provided with lugs or projections 24, two of which are shown in Fig. 2, and said rings 21 are adapted to be turned on the tube 18, so that the notches or recesses 23 in the inwardly-directed flanges 22 will register, and when said rings are in this position the sleeve 17, the tube 18, secured thereto, and the rings 21, mounted on said tube, may be moved longitudinally of the rod 12 and the rods 15, which are hinged thereto.

In Fig. 1 the lock is represented as provided with five of the rings 21, but two of these rings are dummies and are not operative. It will be apparent, however, that any desired number of the operative rings 21 may be employed, and the operation will be readily understood from the foregoing description when taken in connection with the accompanying drawings and the following statement thereof.

The rings 21 are in practice provided with numbers or letters, which are placed on the perimeters thereof in the manner of ordinary combination-locks of this class, and said numbers or letters serve as means for determining the method of the operation of the rings, and it will be understood that the notches or recesses 23 in the flanges 22 of said rings may be formed in said flanges at any desired point, and in the construction of the lock the arrangement of these notches or recesses with reference to the numerals or letters placed on said rings is known only to the owner of the lock, and by turning said rings, as hereinbefore described, so that the notches or recesses 23 will register with each other and so that the lugs or projections 24 on one of the rods 15 may be moved therethrough it will be apparent that the sleeve 17, with its connected parts, may be moved longitudinally, so as to free the rods 15, and in this position of the parts the rods 15 may be turned on their hinge at 14, and whenever it is desired to lock the bicycle the jaws 16 of the rods 15 are caused to grasp the tire and the rim of the wheel, as shown in Fig. 1, and the sleeve 17 and its connected parts are moved in the position shown in Fig. 2, and the rings 21 are turned, so that said sleeve and its connected parts cannot be moved longitudinally of the rods 12 and 15.

As thus constructed it will be seen that the tube 18 constitutes an extension of the sleeve 17 and that the rings 21 are mounted on this extension and held thereon by the flange 19, and when the lock is not in use it is turned back over and rests against or upon the rod 8 of the frame, with which it is connected, and my improved lock is simple in construction and operation and perfectly adapted to accomplish the result for which it is intended, and it will be apparent that changes in and modifications of the construction herein described may be made without departing from the spirit of my invention or sacrificing its advantages.

Although I have shown my invention applied to one of the forks of the vehicle and operating in connection with one of the main wheels thereof, it will be apparent that my improved lock may be applied to other parts of the frame and may be operated on or in connection with other movable parts—such as the pedal-cranks, the main sprocket-wheel, and the drive-chain.

Having fully described my invention, I claim as new and desire to secure by Letters Patent—

A lock for bicycles and similar vehicles, said lock comprising a rod which is pivotally connected with the frame of the vehicle, two rods hinged thereto which are semicircular in cross-section, and each of which is provided at its outer end with a semicircular jaw, and a sleeve mounted on said rods and adapted to slide thereon, and over said hinge, said sleeve being provided with a tubular extension on which are mounted a plurality of rings provided with inwardly-directed flanges in which are formed notches or recesses, and one of said hinged rods being provided with lugs or projections, substantially as shown and described.

In testimony that I claim the foregoing as my invention I have signed my name, in presence of the subscribing witnesses, this 10th day of May, 1897.

NELS F. BENSON.

Witnesses:
   C. GERST,
   A. C. VAN BLARCOM.